Patented Mar. 27, 1951

2,546,930

UNITED STATES PATENT OFFICE

2,546,930

PROCESS OF POLYMERIZATION IN THE PRESENCE OF A DOUBLE FLUORIDE CATALYST

Herbert J. Passino, Englewood, N. J., assignor to The M. W. Kellogg Company, Jersey City, N. J., a corporation of Delaware No Drawing. Original application January 8, 1943, Serial No. 471,777. Divided and this application August 21, 1948, Serial No. 45,568

13 Claims. (Cl. 260—683.15)

This invention relates to improvements in the activation of hydrocarbons in catalytic hydrocarbon conversion processes. More particularly, the invention relates to improvements in catalytic condensation reactions of hydrocarbons, such as polymerization of olefin hydrocarbons and the alkylation of iso-paraffin hydrocarbons and cyclic hydrocarbons, such as aromatic hydrocarbons, by means of olefin hydrocarbons, and to improvements in catalytic isomerization of hydrocarbons, such as aliphatic hydrocarbons and poly-alkylated cyclic hydrocarbons. This application is a division of my prior and copending application serial No. 471,777, filed January 8, 1943, now Patent No. 2,459,775, issued January 18, 1949, relating to alkylation with a double fluoride catalyst.

In accordance with this invention, the abovementioned catalytic conversions of hydrocarbons are effected in the presence of catalytic material comprising a compound of hydrogen fluoride and a fluoride selected from the group consisting of alkali metal fluorides, alkaline earth metal fluorides and ammonium fluoride. Such materials, which may comprise one or more mols of hydrogen fluoride in combination with one or more mols of the other fluorides, are referred to hereinafter as compounds of the fluorides, double fluorides, or hydrofluorides of the metals or ammonium. The hydrofluorides of ammonium and the alkali metals, such as potassium and sodium, are particularly suitable for the purposes of this invention, but the use of the hydrofluorides of the alkaline earth metals, including calcium, strontium and barium, is also within the scope of the invention.

The various hydrofluorides may preferably be prepared by mixing the hydrogen fluoride in a liquid condition with a suitable amount of the metal fluoride or ammonium fluoride. The amount of the metal fluorides or ammonium fluoride, which is added to the hydrogen fluoride, is selected to produce in the resulting product the desired mol ratio of the fluorides. For example, in the production of KF.3HF one mol of potassium fluoride is combined with three mols of hydrogen fluoride to form a solid derivative which has a melting point of 150° F. If it is desired to produce a hydrofluoride having a smaller proportion of hydrogen fluoride, such as potassium dihydrofluoride, two mols of hydrogen fluoride and one mol of potassium fluoride are mixed to produce a solid derivative which has a somewhat higher melting point.

Mixtures of hydrogen fluoride with the metal fluoride or ammonium fluoride in mol ratios other than those expressed by whole numbers result in the production of a mixture of hydrofluorides having different mol ratios. Even when mixing the hydrogen fluoride and metal or ammonium fluoride in exact mol ratios the result may be a mixture of hydrofluorides of different mol ratios if uniform distribution is not maintained during the mixing operation. This does not detract materially from the value of the catalyst, however, since the difference in catalytic activity of the hydrofluorides having reasonably similar ratios of hydrogen fluoride to the metal or ammonium fluoride is rather slight.

The melting point, or melting points, of the hydrofluorides increases generally with decreasing ratios of hydrogen fluoride to the metal or ammonium fluoride. If it is desired to maintain the catalyst in the solid form while operating at a relatively high temperature, the proportion of the hydrogen fluoride and metal or ammonium fluoride may be controlled to produce a hydrofluoride, or mixture of hydrofluorides, melting only at temperatures above the proposed reaction temperature. The melting points of the hydrofluorides, in relation to the reaction temperature, may influence the selection of the particular hydrofluoride to be employed. The sodium hydrofluorides in general have higher melting points than the corresponding potassium hydrofluorides and the hydrofluorides of the alkaline earth metals have still higher melting points. On the other hand, ammonium hydrofluorides melt at lower temperatures than the corresponding potassium hydrofluorides.

The catalyst may be employed in the solid state, but this is not essential. The hydrocarbon reactants, in a liquid or gaseous condition or in a mixed liquid and gaseous condition, may be passed through a granular mass of the catalyst which is maintained in suitable reactors. The use of a fixed bed of granular material is not essential, however, as the catalyst may be moved, intermittently or continuously, through the reaction zone as the result of continuous or intermittent removal of the catalyst from the bottom of the reactor and continuous replenishment with fresh catalyst at the top of the reactor. In another method of contacting the catalyst and reactants the catalyst is suspended as a powder in the stream of reagents and passed through the reaction zone with the reactants. In another method of operation, powdered catalyst is maintained as a fluidized, or semi-fluid, mass in the reaction zone by the passage of vaporized reactants upwardly through the reactor. Continuous addition and withdrawal of catalyst is effected by the suspension of catalyst in the stream of reactants and by direct addition and withdrawal by means independent of the stream of reactants. In all operations involving the use of the catalyst in a non-static condition substantially continuous operation is maintained.

Operations in which the catalyst is employed in the molten condition also can be carried out with continuous or intermittent contact of the catalyst and reactants which may be in the liquid or vapor phase or both. For example, liquefied potassium trihydrofluoride may be intimately mixed with liquid reactants to form an emulsion. A body of such emulsion may be maintained continuously by continuous withdrawal of a portion thereof and continuous additions thereto of fresh and recycled reactants and fresh or recycled catalyst.

When the catalyst becomes deactivated, as by the accumulation of carbonaceous deposits thereon or by contamination of a liquefied catalyst by the accumulation therein of hydrocarbon fluoride complexes, the catalyst may be treated to recover, in part at least, the hydrogen fluoride component. This is done by heating the deactivated catalyst, in the reactor or if withdrawn therefrom, to drive off all or part of the hydrogen fluoride content thereof, which is then re-employed in making further supplies of hydrofluoride catalyst. The metallic fluoride can also be regenerated in such a way as to be suitable for use in preparing additional hydrofluoride addition compounds.

Of the various hydrofluorides mentioned above, those of sodium, potassium and ammonium are preferred, but ammonium hydrofluoride is particularly useful because of its relatively high catalytic activity and because it can be regenerated readily at low temperatures. Its use, however, is limited to reagents at temperatures low enough to avoid decomposition of the ammonium hydrofluoride.

The reaction conditions of temperature, pressure and space velocity, or time of contact, depend upon the nature of the reaction, the reactants, and the character of the desired product.

In polymerization reactions the application of pressure is desirable, and relatively high temperatures are required. For example, in the polymerization of propylene and butylenes, temperatures in the range of 200° F. to 400° F. may be used, with a pressure of 200 pounds per square inch or higher.

In alkylation reactions the application of pressure is less essential since the principal need for pressure is to prevent volatilization of hydrogen fluoride. In the alkylation of isoparaffin hydrocarbons with olefin hydrocarbons, temperatures in the range of 32° F. to 200° F. may be employed. The alkylation of aromatic hydrocarbons may be effected at lower temperatures, within the range of 32° F. to 150° F.

Isomerization of paraffin hydrocarbons, such as the conversion of normal butane to iso-butane and the isomerization of light paraffinic naphtha to a product of increased octane number, preferably is carried out in the presence of a boron fluoride promoter. The boron fluoride may be introduced into the reaction zone with the reactants and recovered therefrom, for recirculation, at the exit of the reactor. The use of boron fluoride requires the application of substantial pressure on a reaction zone to insure good contact of the boron fluoride with the hydrofluoride catalyst and the hydrocarbon reactants. For this purpose pressures of 200 pounds to 500 pounds per square inch are desirable.

The isomerization of olefin hydrocarbons and poly-alkylated naphthenes and aromatics does not require the use of boron fluoride so that these reactions may be conducted under somewhat lower pressure. For the isomerization of olefin hydrocarbons a temperature of 100° F. to 300° F. may be employed while the isomerization of poly-alkylated cyclic hydrocarbons may be effected at a somewhat lower temperature within the range of 100° F. to 200° F.

The space velocity of the reactants in the reaction zone, or the time of residence of the reactants therein, naturally should be long enough to achieve the desired conversion reactions to the maximum extent which is consistent with reasonable suppression of undesired side, or secondary, reactions. The determination of this factor depends upon numerous conditions such as the temperature and pressure employed, the activity of the catalyst, the character of the catalyst, the character of the reaction, the concentration of the reactants in the reaction mixture, etc. In general, condensation reactions proceed much more quickly than do isomerization reactions. For example, the alkylation of benzene with propylene, in accordance with this invention, proceeds at a high rate at room temperature. On the other hand, the isomerization reactions ordinarily require a substantially longer time of contact of the reactants with the catalyst.

In alkylation reactions it is desirable to maintain a fairly high ratio of the hydrocarbons to be alkylated to the olefin hydrocarbon employed for alkylation purposes. This is desirable to promote the alkylation reaction and minimize the occurrence of side reactions, such as direct polymerization of the olefin reactants, hydrofluorination, etc.

I claim:

1. A method for catalytically polymerizing a hydrocarbon which comprises subjecting an olefin hydrocarbon to polymerization conditions of temperature, pressure and space velocity in the presence of a catalytic material comprising a complex compound of hydrogen fluoride and a fluoride selected from the group consisting of the fluorides of the alkali metals, the alkaline earth metals and ammonium as the major and principal catalytically active component of the catalytic material.

2. A method for catalytically polymerizing a hydrocarbon which comprises subjecting an olefin hydrocarbon to polymerization conditions of temperature, pressure and space velocity in the presence of a catalytic material comprising a double fluoride of hydrogen fluoride and a fluoride selected from the group consisting of alkali metal fluorides, alkaline earth metal fluorides and ammonium fluoride as the major and principal catalytically active component of the catalytic material.

3. A method for catalytically polymerizing a hydrocarbon which comprises subjecting an olefin hydrocarbon to polymerization conditions of temperature, pressure and space velocity in the presence of a catalytic material comprising a double fluoride of hydrogen and an alkali metal as the major and principal catalytically active component of the catalytic material.

4. A method for catalytically polymerizing a hydrocarbon which comprises subjecting an olefin hydrocarbon to polymerization conditions of temperature, pressure and space velocity in the presence of a catalytic material comprising a double fluoride of hydrogen and ammonium as the major and principal catalytically active component of the catalytic material.

5. A method for catalytically polymerizing a hydrocarbon which comprises subjecting an olefin hydrocarbon to polymerization conditions of temperature, pressure and space velocity in the presence of a catalytic material comprising an acid metal fluoride selected from the group consisting of the mono and poly hydrofluorides of the alkali metals, the alkaline earth metals and ammonium as the major and principal catalytically active component of the catalytic material.

6. A method for catalytically polymerizing a hydrocarbon which comprises subjecting an olefin hydrocarbon to polymerization conditions of temperature, pressure and space velocity in the presence of a catalytic material comprising an alkali metal hydrofluoride as the major and principal catalytically active component of the catalytic material.

7. A method for catalytically polymerizing a hydrocarbon which comprises subjecting an olefin hydrocarbon to polymerization conditions of temperature, pressure and space velocity in the presence of a catalytic material comprising sodium hydrofluoride as the major and principal catalytically active component of the catalytic material.

8. A method for catalytically polymerizing a hydrocarbon which comprises subjecting an olefin hydrocarbon to polymerization conditions of temperature, pressure and space velocity in the presence of a catalytic material comprising potassium hydrofluoride as the major and principal catalytically active component of the catalytic material.

9. A method for catalytically polymerizing a hydrocarbon which comprises subjecting an olefin hydrocarbon to polymerization conditions of temperature, pressure and space velocity in the presence of a catalytic material comprising ammonium hydrofluoride as the major and principal catalytically active component of the catalytic material.

10. A method for catalytically polymerizing a hydrocarbon which comprises subjecting an olefin hydrocarbon to polymerization conditions of temperature, pressure and space velocity in the presence of a catalytic material comprising a poly hydrofluoride of an alkali metal as the major and principal catalytically active component of the catalytic material.

11. A method for catalytically polymerizing a hydrocarbon which comprises subjecting an olefin hydrocarbon to polymerization conditions of temperature, pressure and space velocity in the presence of a catalytic material comprising a poly hydrofluoride of ammonium as the major and principal catalytically active component of the catalytic material.

12. A method for catalytically polymerizing olefin hydrocarbons which comprises contacting propylene and butylenes under polymerizing conditions of temperature, pressure and space velocity in the presence of a catalytic material comprising a complex compound of hydrogen fluoride and a fluoride selected from the group consisting of the fluorides of the alkali metals, the alkaline earth metals and ammonium as the major and principal catalytically active component of the catalytic material.

13. A method for catalytically polymerizing olefin hydrocarbons which comprises contacting propylene and butylenes with each other under polymerizing conditions of temperature and pressure in the presence of a catalytic material comprising a double fluoride of hydrogen and an alkali metal as the major and principal catalytically active component of the catalytic material.

HERBERT J. PASSINO.

REFERENCES CITED

The following references are of record in the file of this patent:

UNITED STATES PATENTS

| Number | Name | Date |
|---|---|---|
| 2,421,950 | Linn | June 10, 1947 |
| 2,430,181 | Linn | Nov. 4, 1947 |
| 2,436,929 | Linn | Mar. 2, 1948 |